United States Patent
Gleeson et al.

(10) Patent No.: US 12,449,964 B1
(45) Date of Patent: Oct. 21, 2025

(54) SYSTEM WITH POSITION-SENSITIVE ELECTRONIC DEVICE INTERFACE

(71) Applicant: Apple Inc., Cupertino, CA (US)

(72) Inventors: Brian T. Gleeson, Mountain View, CA (US); Adam S. Meyer, Cupertino, CA (US); David H. Bloom, San Francisco, CA (US); Peter M. Arnold, Mountain View, CA (US)

( * ) Notice: Subject to any disclaimer, the term of this patent is extended or adjusted under 35 U.S.C. 154(b) by 0 days.

(21) Appl. No.: 17/897,020

(22) Filed: Aug. 26, 2022

Related U.S. Application Data

(63) Continuation of application No. 15/669,734, filed on Aug. 4, 2017, now Pat. No. 11,435,888.

(Continued)

(51) Int. Cl.
*G06F 3/04847* (2022.01)
*B60K 35/00* (2006.01)
(Continued)

(52) U.S. Cl.
CPC .......... *G06F 3/04847* (2013.01); *B60K 35/00* (2013.01); *G06F 3/0488* (2013.01); *G08C 17/02* (2013.01); *G08C 17/04* (2013.01); *G08C 23/04* (2013.01); *B60K 35/80* (2024.01); *B60K 2360/566* (2024.01); *B60K 2360/573* (2024.01); *B60R 16/0231* (2013.01); *G06F 3/04842* (2013.01); *G06F 3/165* (2013.01); *G08C 2201/34* (2013.01); *G08C 2201/91* (2013.01); *G08C 2201/92* (2013.01);
(Continued)

(58) Field of Classification Search
CPC ............... G06F 3/04847; G06F 3/0488; G06F 3/04842; G06F 3/165; B60K 35/00; B60K 2370/566; B60K 2370/573; G08C 17/02; G08C 17/04; G08C 23/04; G08C 2201/34; G08C 2201/91; G08C 2201/92; B60R 16/0231; H04L 41/0879; H04L 41/22; H04W 24/00
See application file for complete search history.

(56) References Cited

U.S. PATENT DOCUMENTS

| | | |
|---|---|---|
| 6,020,881 A | 2/2000 | Naughton et al. |
| 6,853,911 B1 | 2/2005 | Sakarya |

(Continued)

*Primary Examiner* — Matthew Ell
*Assistant Examiner* — Alvaro R Calderon, IV
(74) *Attorney, Agent, or Firm* — Treyz Law Group, P.C.; G. Victor Treyz; Kendall P. Woodruff

(57) ABSTRACT

Systems are provided that include electronic equipment and electronic devices. A system may include electronic equipment such as a thermostat or other equipment in a vehicle or home, vehicle navigation equipment, networking equipment, computer equipment, equipment with speakers for playing audio, and other electronic equipment. An electronic device such as a portable electronic device may be placed in the vicinity of electronic equipment by a user. In response to detecting that the electronic device is adjacent to the electronic equipment, control circuitry in the electronic device can automatically display content of the electric device such as a user control interface for the electronic device or information related to operation of the electronic equipment. The system may monitor the position of the electronic device relative to the electronic equipment and can dynamically update the displayed content based on the current device position.

10 Claims, 10 Drawing Sheets

Related U.S. Application Data

(60) Provisional application No. 62/397,465, filed on Sep. 21, 2016.

(51) Int. Cl.

| | |
|---|---|
| *G06F 3/0488* | (2022.01) |
| *G08C 17/02* | (2006.01) |
| *G08C 17/04* | (2006.01) |
| *G08C 23/04* | (2006.01) |
| *B60K 35/80* | (2024.01) |
| *B60R 16/023* | (2006.01) |
| *G06F 3/04842* | (2022.01) |
| *G06F 3/16* | (2006.01) |
| *H04L 41/08* | (2022.01) |
| *H04L 41/22* | (2022.01) |
| *H04W 24/00* | (2009.01) |

(52) U.S. Cl.
CPC .......... *H04L 41/0879* (2013.01); *H04L 41/22* (2013.01); *H04W 24/00* (2013.01)

(56) References Cited

U.S. PATENT DOCUMENTS

| | | | |
|---|---|---|---|
| 7,316,347 B2 | 1/2008 | Poor | |
| 7,394,459 B2 | 7/2008 | Bathiche et al. | |
| 7,472,202 B2 | 12/2008 | Parupudi et al. | |
| 8,145,199 B2 | 3/2012 | Tadayon et al. | |
| 8,330,582 B2 | 12/2012 | Harris et al. | |
| 8,381,135 B2 | 2/2013 | Hotelling et al. | |
| 8,413,882 B1 | 4/2013 | Nidamarthi et al. | |
| 8,538,458 B2 | 9/2013 | Haney | |
| 8,768,539 B1* | 7/2014 | Clement | B60W 10/184 |
| | | | 701/2 |
| 9,140,560 B2 | 9/2015 | Ricci | |
| 9,368,024 B2 | 6/2016 | Tan et al. | |
| 9,452,678 B1* | 9/2016 | Boss | G06F 3/0482 |
| 9,594,500 B2 | 3/2017 | Clements | |
| 9,659,487 B2 | 5/2017 | Tan et al. | |
| 9,691,270 B1 | 6/2017 | Sanders | |
| 9,773,409 B1 | 9/2017 | Sanders | |
| 9,792,018 B2 | 10/2017 | Van Os et al. | |
| 10,135,905 B2 | 11/2018 | Chaudhri et al. | |
| 2002/0196201 A1 | 12/2002 | Rosen | |
| 2003/0073411 A1 | 4/2003 | Meade | |
| 2003/0073412 A1 | 4/2003 | Meade | |
| 2003/0160736 A1 | 8/2003 | Faso et al. | |
| 2005/0083642 A1 | 4/2005 | Senpuku et al. | |
| 2005/0096753 A1 | 5/2005 | Arling et al. | |
| 2005/0159823 A1 | 7/2005 | Hayes et al. | |
| 2005/0162422 A1 | 7/2005 | Miyata | |
| 2005/0177252 A1 | 8/2005 | Chernoff et al. | |
| 2005/0251800 A1 | 11/2005 | Kurlander et al. | |
| 2006/0008256 A1 | 1/2006 | Khedouri et al. | |
| 2006/0146765 A1 | 7/2006 | Van De Sluis et al. | |
| 2006/0294247 A1 | 12/2006 | Hinckley et al. | |
| 2007/0080845 A1 | 4/2007 | Amand | |
| 2007/0188323 A1 | 8/2007 | Sinclair et al. | |
| 2007/0190939 A1 | 8/2007 | Abel | |
| 2007/0252804 A1 | 11/2007 | Engel et al. | |
| 2007/0279241 A1* | 12/2007 | Jung | H04W 4/02 |
| | | | 340/691.6 |
| 2007/0296552 A1 | 12/2007 | Huang et al. | |
| 2008/0004769 A1 | 1/2008 | Lenneman et al. | |
| 2008/0122799 A1 | 5/2008 | Pryor | |
| 2008/0186282 A1 | 8/2008 | Nix et al. | |
| 2008/0276182 A1 | 11/2008 | Leow | |
| 2009/0132130 A1 | 5/2009 | Kumon et al. | |
| 2009/0153289 A1 | 6/2009 | Hope et al. | |
| 2009/0178008 A1 | 7/2009 | Herz et al. | |
| 2009/0265636 A1 | 10/2009 | Ruiz-Velasco et al. | |
| 2009/0287412 A1* | 11/2009 | Menzel | G01C 21/36 |
| | | | 701/117 |
| 2009/0295731 A1 | 12/2009 | Kim et al. | |
| 2010/0066667 A1 | 3/2010 | MacDougall et al. | |
| 2010/0081375 A1 | 4/2010 | Rosenblatt et al. | |
| 2010/0165216 A1 | 7/2010 | Beals | |
| 2010/0220250 A1* | 9/2010 | Vanderwall | G01C 21/3688 |
| | | | 455/152.1 |
| 2010/0295803 A1* | 11/2010 | Kim | G06F 3/167 |
| | | | 345/173 |
| 2010/0297941 A1* | 11/2010 | Doan | G08C 17/02 |
| | | | 455/41.2 |
| 2011/0121067 A1 | 5/2011 | Longacre, Jr. et al. | |
| 2011/0185390 A1 | 7/2011 | Faenger et al. | |
| 2011/0195699 A1 | 8/2011 | Tadayon et al. | |
| 2011/0265003 A1 | 10/2011 | Schubert et al. | |
| 2011/0291945 A1 | 12/2011 | Ewing, Jr. et al. | |
| 2012/0028680 A1* | 2/2012 | Breed | B60R 21/01546 |
| | | | 455/556.1 |
| 2012/0032945 A1 | 2/2012 | Dare et al. | |
| 2012/0065815 A1* | 3/2012 | Hess | G06F 9/451 |
| | | | 701/2 |
| 2012/0071151 A1* | 3/2012 | Abramson | H04M 1/72463 |
| | | | 455/418 |
| 2012/0092251 A1 | 4/2012 | Hashimoto et al. | |
| 2012/0095643 A1* | 4/2012 | Bose | B60K 37/00 |
| | | | 715/744 |
| 2012/0115446 A1* | 5/2012 | Gautama | H04W 4/44 |
| | | | 455/414.1 |
| 2012/0206339 A1 | 8/2012 | Dahl | |
| 2012/0209839 A1 | 8/2012 | Andrews et al. | |
| 2012/0212650 A1 | 8/2012 | Fukuda | |
| 2012/0214466 A1 | 8/2012 | Tadayon et al. | |
| 2012/0214470 A1 | 8/2012 | Tadayon et al. | |
| 2012/0231738 A1* | 9/2012 | Khamharn | B60K 35/00 |
| | | | 455/41.2 |
| 2012/0239221 A1 | 9/2012 | Mighdoll et al. | |
| 2012/0242455 A1 | 9/2012 | Hale et al. | |
| 2012/0242510 A1* | 9/2012 | Choi | G01C 21/3688 |
| | | | 340/988 |
| 2012/0262398 A1 | 10/2012 | Kim et al. | |
| 2012/0282913 A1* | 11/2012 | Kaindl | B60H 1/00657 |
| | | | 455/566 |
| 2013/0009907 A1 | 1/2013 | Rosenberg et al. | |
| 2013/0050151 A1 | 2/2013 | Tu et al. | |
| 2013/0080945 A1 | 3/2013 | Reeves | |
| 2013/0093962 A1 | 4/2013 | Bruhn et al. | |
| 2013/0138714 A1 | 5/2013 | Ricci | |
| 2013/0162573 A1 | 6/2013 | Huang | |
| 2013/0198802 A1 | 8/2013 | Ricci | |
| 2013/0225078 A1 | 8/2013 | Johansson et al. | |
| 2013/0244634 A1 | 9/2013 | Garrett et al. | |
| 2013/0295901 A1* | 11/2013 | Abramson | H04W 12/082 |
| | | | 455/418 |
| 2013/0339345 A1 | 12/2013 | Soto Matamala et al. | |
| 2014/0005859 A1* | 1/2014 | Baskin | G07C 9/00309 |
| | | | 701/2 |
| 2014/0007010 A1 | 1/2014 | Blom | |
| 2014/0187200 A1 | 7/2014 | Reitter et al. | |
| 2014/0201689 A1 | 7/2014 | Bedikian et al. | |
| 2014/0277843 A1 | 9/2014 | Langlois et al. | |
| 2014/0316609 A1* | 10/2014 | Washington | B60R 16/037 |
| | | | 701/2 |
| 2014/0368456 A1 | 12/2014 | Sakai | |
| 2015/0002390 A1 | 1/2015 | Park et al. | |
| 2015/0091708 A1 | 4/2015 | Tan et al. | |
| 2015/0091810 A1 | 4/2015 | Pan | |
| 2015/0220299 A1 | 8/2015 | Kim et al. | |
| 2015/0324162 A1 | 11/2015 | Kim et al. | |
| 2015/0332532 A1* | 11/2015 | Lee | G07C 9/00658 |
| | | | 340/5.72 |
| 2016/0021167 A1* | 1/2016 | Park | H04L 67/025 |
| | | | 715/740 |
| 2016/0048304 A1 | 2/2016 | Niranjani et al. | |
| 2016/0266786 A1* | 9/2016 | Arnold | G06F 3/04847 |
| 2016/0267785 A1 | 9/2016 | Tan et al. | |
| 2016/0283084 A1* | 9/2016 | Keysers | G06F 3/04842 |
| 2016/0381171 A1 | 12/2016 | Anderson et al. | |
| 2017/0068507 A1* | 3/2017 | Kim | G06F 1/3228 |
| 2017/0096124 A1* | 4/2017 | Watanabe | H04W 4/027 |
| 2017/0115851 A1 | 4/2017 | Eicher et al. | |

(56) References Cited

U.S. PATENT DOCUMENTS

| | | | |
|---|---|---|---|
| 2017/0151928 A1* | 6/2017 | Kang | B60R 25/2045 |
| 2017/0166056 A1* | 6/2017 | Buttolo | B60K 37/06 |
| 2017/0192451 A1* | 7/2017 | Choi | B60K 35/00 |
| 2018/0069930 A1* | 3/2018 | Brusco | H04M 9/00 |
| 2019/0034075 A1 | 1/2019 | Smochko et al. | |

* cited by examiner

SYSTEM WITH POSITION-SENSITIVE ELECTRONIC DEVICE INTERFACE

This application is a continuation of patent application Ser. No. 15/669,734, filed Aug. 4, 2017, which claims the benefit of provisional of 62/397,465, filed on Sep. 21, 2016, both of which are hereby incorporated by reference herein in their entireties.

FIELD

This relates generally to electronic systems, and, more particularly, to systems in which electronic devices can serve as system interfaces.

BACKGROUND

Electronic equipment is often provided with buttons and other input devices. A user may use the input devices to adjust settings for the equipment. For example, a user may rotate a knob on an audio system in a home or vehicle to adjust a volume setting. Electronic equipment may use speakers and displays to provide a user with output.

It can be challenging to interact with electronic equipment using only the input devices that are included in the equipment. Button-based interfaces are often limiting, but electronic equipment may not include more elaborate interfaces in order to minimize cost and complexity.

SUMMARY

A system may include electronic equipment such as a thermostat or other equipment in a vehicle or home, vehicle navigation equipment or other vehicle equipment, wireless network equipment or other networking devices, computer equipment such as a desktop computer with a display or other computing device, equipment with speakers for playing audio or other media playback equipment, or other electronic equipment. The system may also include an electronic device. The electronic device may be a cellular telephone, tablet computer, wristwatch device, or other portable device having a touch-sensitive display.

During use of the system, a user may place an electronic device such as a portable electronic device in the vicinity of the electronic equipment. When not adjacent to the electronic equipment, the portable device may operate normally and may present information to a user that is associated with the normal operation of the portable device. In response to detecting that the electronic device is adjacent to the electronic equipment, control circuitry in the electronic device can automatically display content on the electric device that is associated with the electronic equipment. For example, the control circuitry can automatically display a user control interface for the electronic device or can automatically display other information related to operation of the electronic equipment.

A user may tap on on-screen options and other interface elements in the user control interface to adjust settings in the electronic equipment. The system may monitor the position of the electronic device relative to the electronic equipment and can dynamically update the displayed content based on the current device position.

DETAILED DESCRIPTION

Figure 1:
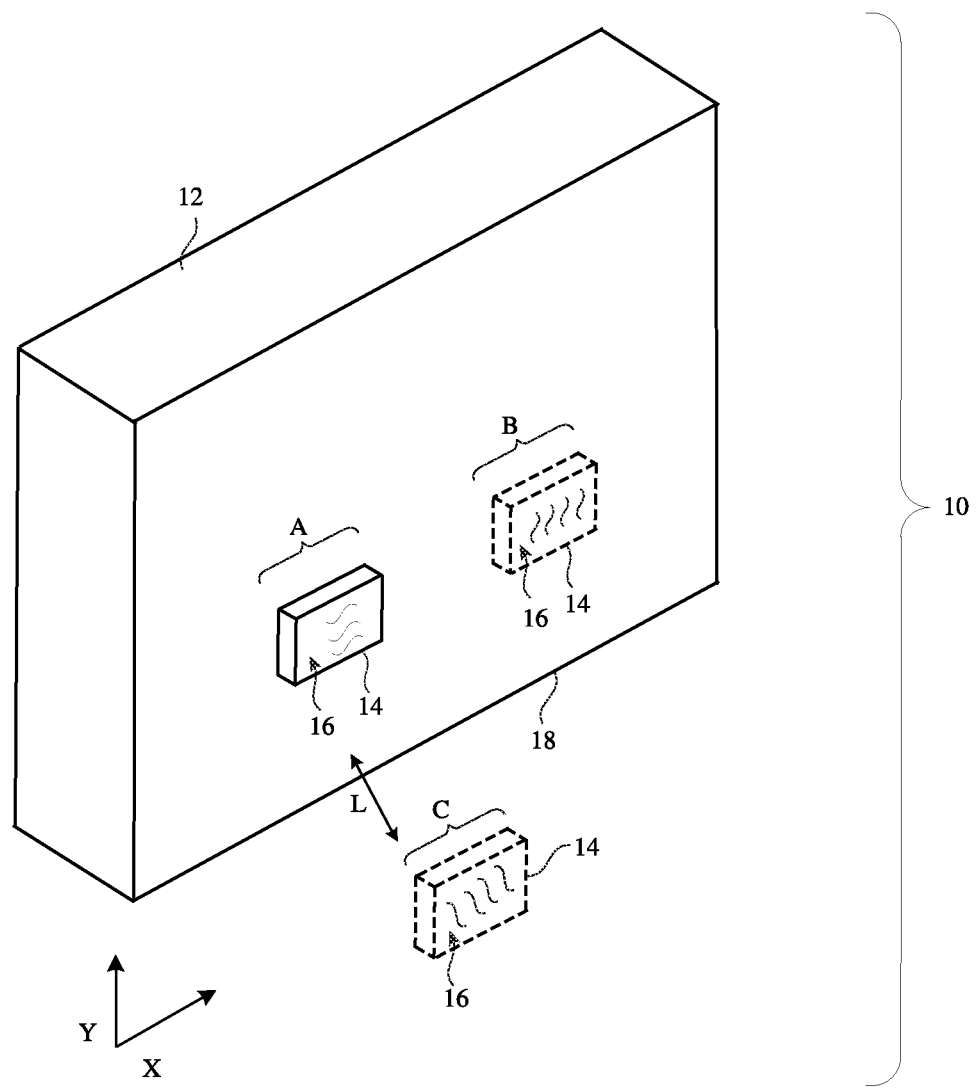
FIG. 1 is a perspective view of an illustrative system in which an electronic device is being used to serve as a user control interface for electronic equipment in accordance with an embodiment.

FIG. 1 is a diagram of an illustrative system of the type that may be used to allow an electronic device to serve as a user interface for adjacent electronic equipment. System 10 of FIG. 1 may be a vehicle system, a building system (e.g., a home or office system), or other system. Configurations in which electronic devices such as cellular telephones or tablet computers are used as user interfaces for electronic equipment in vehicles, offices, and other environments may sometimes be described herein as examples. In general, any suitable electronic devices may be used by a user as a user interface and any suitable electrical equipment may receive input and may supply output using the user interface.

As shown in FIG. 1, system 10 may include electronic equipment with displays such as electronic equipment 12. Equipment 12 may form part of a vehicle dashboard or other equipment in a vehicle, may be mounted on a wall or other structure in a building, may be a stand-alone computer such as a desktop computer, laptop computer, or tablet computer, may be embedded equipment in a kiosk, may be other equipment including control circuitry, may be portable equipment such as a cellular telephone, wristwatch, or other portable electronic device, may be a display or a display with an embedded computer, may be a television, may be a media playback device such as a speaker (e.g., a speaker with buttons, an internet connection, and a voice recognition interface, a speaker that forms part of an audio-visual system in a home or office, a countertop wireless speaker, etc.), may be networking equipment such as a router, access point, or switch, or may be other electronic equipment.

System 10 may also include one or more electronic devices that can serve as user interfaces for the electronic equipment such as electronic device 14 of FIG. 1. Electronic device 14 may be a portable electronic device such as a computer (e.g., a tablet computer), a cellular telephone, a wristwatch device, or other portable electronic equipment.

System 10 may include circuitry that allows the relative position between device 14 and equipment 12 to be determined. Device 14 may include a display such as display 16 (e.g., a touch-sensitive display). During operation, interactive content may be presented on display 16. The interactive content may include, for example, selectable on-screen options. A user can tap on a desired option or can provide other input to device 14 to control the operation of device 14 and equipment 12. In this way, device 14 may serve as a user control interface for equipment 12.

The interactive information that is presented on display 16 may be dynamically updated based on the position of device 14 and display 16 relative to equipment 12. This information can also be updated based on the current operational states of equipment 12 and/or device 14 (sometimes referred to as context or operational context). As shown in FIG. 1, for example, equipment 12 may have a surface such as surface 18. Surface 18 may be, for example, a vehicle dashboard surface and/or other interior vehicle surfaces, a surface of a wall in a building, a surface of a housing in a stand-alone electronic device, or other surface associated with electronic equipment 12. Using sensors in device 14 and/or sensors in equipment 12 under surface 18 or sensors elsewhere in a vehicle or building associated with equipment 12, the position of device 14 on surface 18 (e.g., the position of device 14 in lateral dimensions X and Y in the example of FIG. 1) may be detected and used in updating the user interface of device 14.

Consider, as an example, a scenario in which device 14 is placed in position A on surface 18. In this position, system 10 may detect that device 14 is adjacent to equipment 12 and can determine that equipment 12 is performing a first function. As a result, system 10 may direct display 16 to display a user interface that is based on the current position of device 14 relative to equipment 12 (e.g., position A) and/or that is based on the current operational state of system 10 (e.g., a state in which equipment 12 is performing the first function). In this mode of operation, a user can use the displayed user interface on device 14 to control equipment 12 and/or to receive output from equipment 12.

When a user desires to control another aspect of equipment 12 (e.g., a feature that is associated with position B on surface 18), the user may move device 14 into position B on surface 18. System 10 may detect that device 14 is adjacent to equipment 12 in position B and can determine that equipment 12 is performing a second function. As a result, system 10 may direct display 16 to display an updated user interface that is based on the current position of device 14 relative to equipment 12 (e.g., position B) and/or that is based on the current operational state of system 10 (e.g., a state in which equipment 12 is performing the second function). This allows the user to receive output from equipment 12 that is appropriate when device 14 is in position B and allows the user to supply input to equipment 12 using the current user interface. For example, the user can supply input using the user interface that has been selected based on device 14 being located in position B and/or can use display 16 of device 14 to display output from equipment 12.

If a user moves device 14 away from equipment 12 to a position such as position C of FIG. 1, device 14 may revert to its normal operating state. For example, a user interface that was displayed on display 16 when device 14 was adjacent to equipment 12 may be removed and replaced with on-screen options that relate to the operation of device 14 separately from equipment 12.

System 10 may use any suitable circuitry to measure the position of device 14 relative to equipment 12 (e.g., wireless circuits, sensors, etc.). Device 14 may be considered to be adjacent to equipment 12 when device 14 is separated from equipment 12 (e.g., surface 18 or other portion of equipment 12) by less than a given distance. As shown in FIG. 1, device 14 and equipment 12 may be separated by a distance L. When L is less than a predetermined threshold, device 14 may be considered to be adjacent to equipment 12. When L is more than the threshold, device 14 may be considered to be not adjacent to equipment 12. The threshold distance that separates adjacent devices from non-adjacent devices may have any suitable value (e.g., a value of 1-100 mm, a value of 1-100 cm, a value of 1-10 cm, a value of 1-5 cm, a value of 25 cm, a value that is less than 25 cm, a value of 10 cm, a value that is less than 10 cm, a value of 5 cm, a value that is less than 5 cm, a value of 2 cm, a value that is less than 2 cm, a value that is more than 1 mm, etc.).

Distance L may be determined using wireless positioning circuitry in equipment 12 and device 14 (e.g., ultrawideband radio-frequency transceiver circuitry such as IEEE 802.15.4 transceiver circuitry), may be determined using light-based or radio-frequency-based proximity sensor circuitry, may be determined using near-field communications circuitry, and/or may be determined using magnetic sensors, acoustic sensors, light sensors, cameras, and other sensors and circuits in system 10. If desired, wireless positioning circuitry and other circuitry for determining the position of device 14 relative to equipment 12 may include wireless equipment that emits beacons and other wireless signals and/or other wireless equipment. Wireless equipment in system 10 may be included in equipment 12, device 14, and/or other devices.

Figure 2:
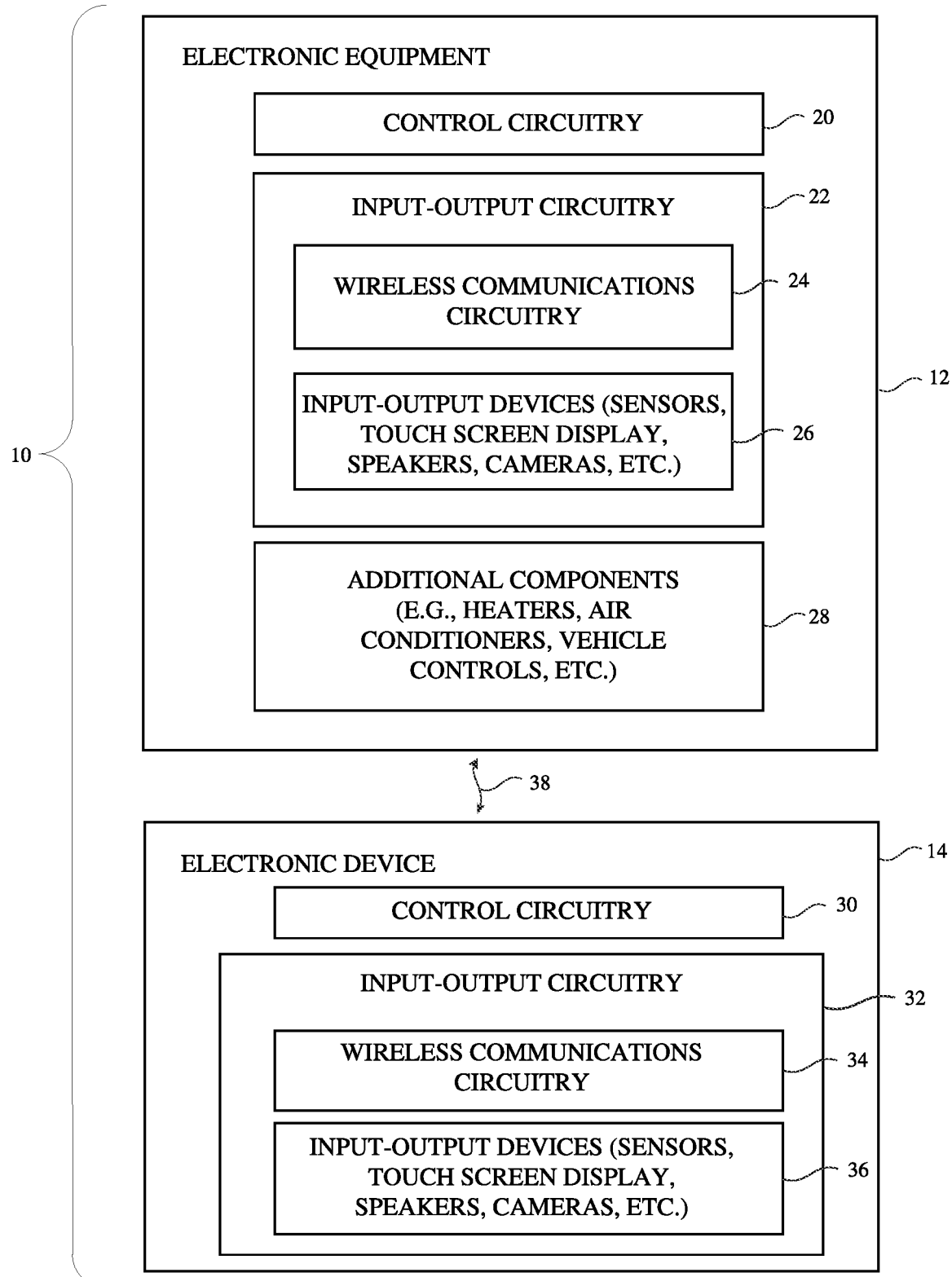
FIG. 2 is a schematic diagram of an illustrative system of the type shown in FIG. 1 in accordance with an embodiment.

A schematic diagram of system 10 is shown in FIG. 2. As shown in FIG. 2, equipment 12 may include control circuitry 20 and device 14 may include control circuitry 30. Control circuitry 20 and control circuitry 30 may include storage and processing circuitry for supporting the operation of system 10. The storage and processing circuitry may include storage such as hard disk drive storage, nonvolatile memory (e.g., flash memory configured to form a solid state drive), volatile memory (e.g., static or dynamic random-access-memory), etc. Control circuitry 20 and 30 may also include processing circuitry based on one or more microprocessors, microcontrollers, digital signal processors, baseband processors, power management units, audio chips, application specific integrated circuits, etc.

The processing circuitry in control circuitry 20 and 30 may be used to control the operation of equipment 12 and devices such as device 14 in system 10. For example, in scenarios in which equipment 12 is a vehicle, control circuitry 20 may be used to control vehicle controls (steering, brakes, propulsion, etc.) and other components in the vehicle. In scenarios in which equipment 12 is installed in a building, control circuitry 20 may be used to control environmental systems (heating, air conditioning, lighting, etc.) in the building. Control circuitry 30 may be used to control the operation of electronic device 14.

The processing circuitry in control circuitry 20 and 30 may also be used to gather input from input-output devices (see, e.g., input-output circuitry 22 of equipment 12 and input-output circuitry 32 of device 14). Equipment 12 may include wireless communication circuitry 24. Device 14 may include wireless communications circuitry 34. Control circuitry 20 and 30 may use circuitry 24 and 34 to communicate over wireless links such as wireless link 38. Wireless communications circuitry 24 and 34 may support Bluetooth® communications, other short-range wireless communications (e.g., IEEE 802.11 wireless local area network communications), cellular telephone communications, near-field communications, etc.

Input-output circuitry 22 may include input-output devices 26 and input-output circuitry 32 may include input-output devices 36. Input-output devices 26 may include sensors, buttons, keyboards, cameras, and other input-output devices. Sensors in devices 26 may include force sensors, accelerometers, magnetic sensors, touch sensors such as optical touch sensors and capacitive touch sensors (e.g., capacitive touch sensor that form part of a touch-sensitive display), strain gauges, gas sensors, pressure sensors, moisture sensors, temperature sensors, proximity sensors (e.g., radio-frequency proximity sensors and/or light-based proximity sensors based on infrared light-emitting diodes and corresponding infrared light detectors), and other sensing circuitry.

Electronic equipment 12 and device 14 may include additional components. For example, electronic equipment 12 may include components 28 such as heaters, air conditioners, other environmental control systems, may include vehicle controls (steering systems, braking systems, propulsion systems, etc.), may include lighting, sound systems, navigation systems, media display systems (e.g., displays, audio equipment, etc.), and/or may include other components.

Figure 3:
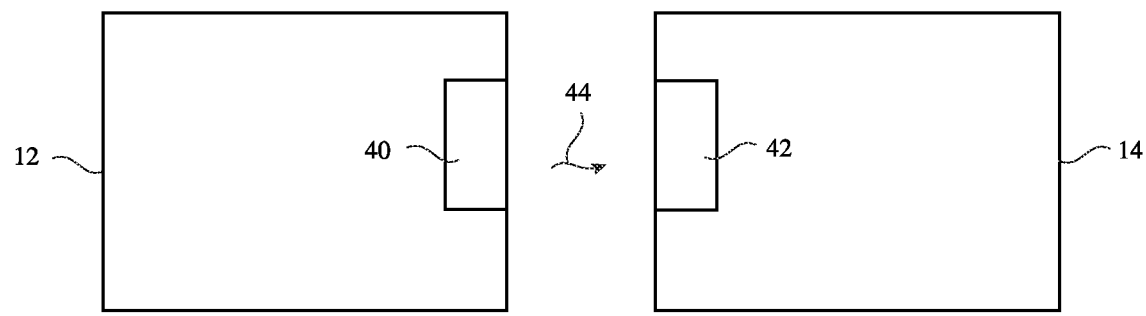
FIGS. 3, 4, and 5 are diagrams of illustrative electronic equipment and electronic devices showing how components in the equipment and devices may be used to determine when the devices are adjacent to the equipment in accordance with an embodiment.
Figure 4:
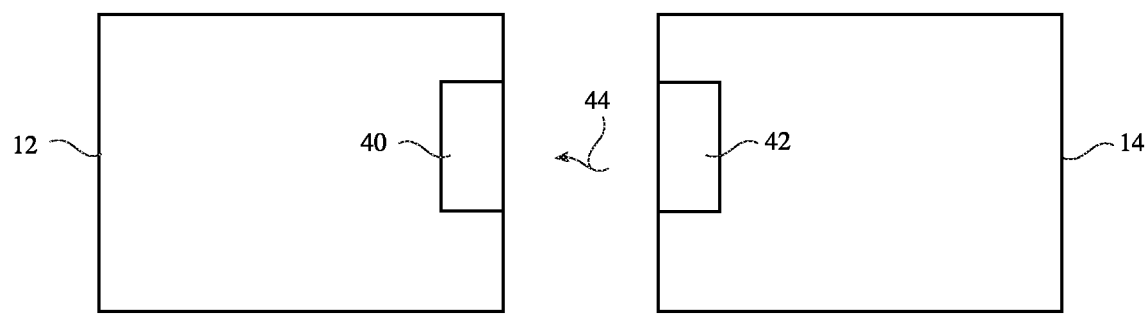
Figure 5:
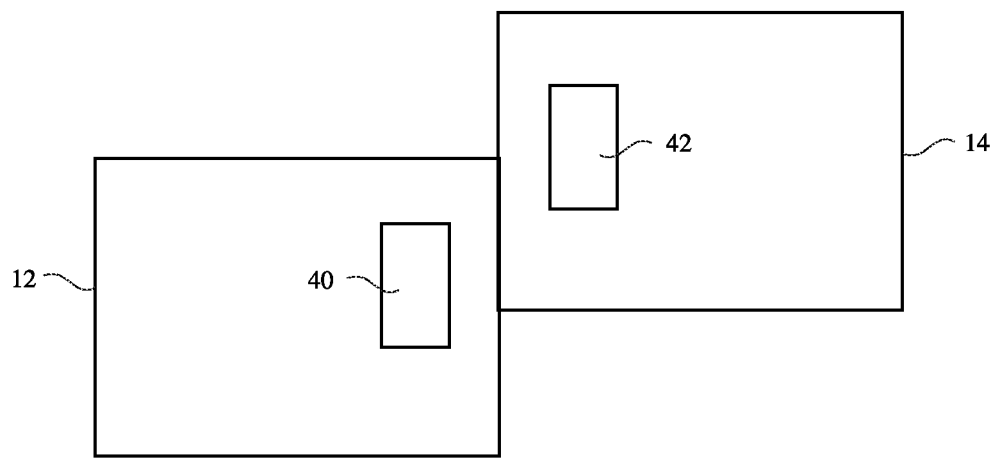

FIGS. 3, 4, and 5 show illustrative techniques for determining the position of device 14 relative to equipment 12 (e.g., relative to surface 18 or other portions of equipment 12). These techniques and other suitable techniques may be used to determine whether device 14 is adjacent to equipment 12 (e.g., to determine whether device 14 is farther away from equipment 12 than a given distance or is closer to equipment 12 than the given distance) and/or to determine whether device 14 is in a first position adjacent to equipment 12 such as position A of FIG. 1 or a second position adjacent to equipment 12 such as position B of FIG. 1.

In the example of FIG. 3, equipment 12 is using component 40 to provide signals 44 to component 42 of device 14. Component 42 may monitor the received signals and information on the transmitted and received signals may be used in determining the position of device 14 relative to equipment 12. Component 40 may be, for example, a magnet, signals 44 may be static magnetic fields produced by the magnet, and component 42 may be a magnetic sensor. If desired, component 40 may be a light-emitting component (e.g., a light-emitting diode, etc.), signals 44 may be light, and component 42 may be a light detector (e.g., a single light sensor, a two-dimensional image sensor, etc.). One or more cameras in system 10 may also be used to determine device and equipment positions in the absence of emitted light. For example, component 42 may be a camera that captures images of some or all of equipment 12 to help determine the position of component 42 relative to equipment 12. As another example, component 40 may be a radio-frequency transmitter, signals 44 may be radio-frequency signals, and component 42 may be a radio-frequency receiver. In near-field communications scenarios, component 40 may include a near-field communications transmitter (e.g., a transmitter in a transceiver) and a near-field communications antenna (e.g., a coil), whereas component 42 may include a near-field communications antenna (e.g., a coil) and a near-field communications receiver (e.g., a receiver in a transceiver circuit). Component 40 may be a speaker or other acoustic transmitter that generates sound (e.g., signals 44 may be acoustic signals such as ultrasonic signals) and component 42 may be a microphone. In general, component 40 may be configured to produce any suitable output (e.g., signals 44 may be acoustic signals, static electric fields, static magnetic fields, alternating-current electric and/or magnetic fields, light, etc.).

In the example of FIG. 4, device 14 is configured to use component 42 to emit signals 44 that are detected by component 40 in equipment 12. Component 42 may be a magnet, a light-emitting component, a radio-frequency signal transmitter, a near-field communications transmitter, an acoustic signal transmitter (e.g., a speaker that produces an ultrasonic tone or other audio output), or other suitable signal emitting component, signals 44 may be magnetic signals, light, far-field or near-field radio-frequency signals, or acoustic signals, and component 40 may be a magnetic sensor, a light sensor, a radio-frequency receiver, a near-field communications receiver, or a microphone (as examples).

If desired, configuration of the type shown in FIG. 3 may be combined with configurations of the type shown in FIG. 4. For example, device 14 may include a component that emits signal 44 and a component that detects reflected signals that are indicative of the presence and position of equipment 12 relative to device 14. Equipment 12 may also use this type of approach in determining the position of device 14.

In some situations, the presence of device 14 in the vicinity of equipment 12 can be detected by sensing vibrations due to physical contact between equipment 12 and device 14. As an example, consider the scenario of FIG. 5. In this arrangement, equipment 12 includes a component such as component 40 and device 14 includes a component such as component 42. Components 40 and 42 may be accelerometers that can measure vibrations in equipment 12 and device 14 and/or that can measure changes in acceleration resulting from changes in motion of equipment 12 and/or device 14. When a user bumps device 14 against equipment 12, vibrations and changes in acceleration can be detected by device 14 and/or equipment 12 and this information can be used to confirm that device 14 is adjacent to equipment 12.

In some scenarios of the type shown in FIGS. 3, 4, and 5, equipment 12 and device 14 may exchange signals (e.g., equipment 12 and device 14 may support bidirectional wireless communications). As an example, a first device may monitor for signals from a second device. When the signals are detected, the first device may send information to the second device to inform the second device of the signal detection event and/or to request that the second device send additional signals to confirm that the first and second devices are adjacent. The second device may, as an example, be requested to send more signals or different signals than are normally sent. These signals may then be used to help determine the current position of device 14 relative to equipment 12 (e.g., with enhanced accuracy, with an enhanced range of positional coverage, etc.). Exchanges of information such as these may be supported by wireless communications circuitry 24 and 34.

Figure 6:
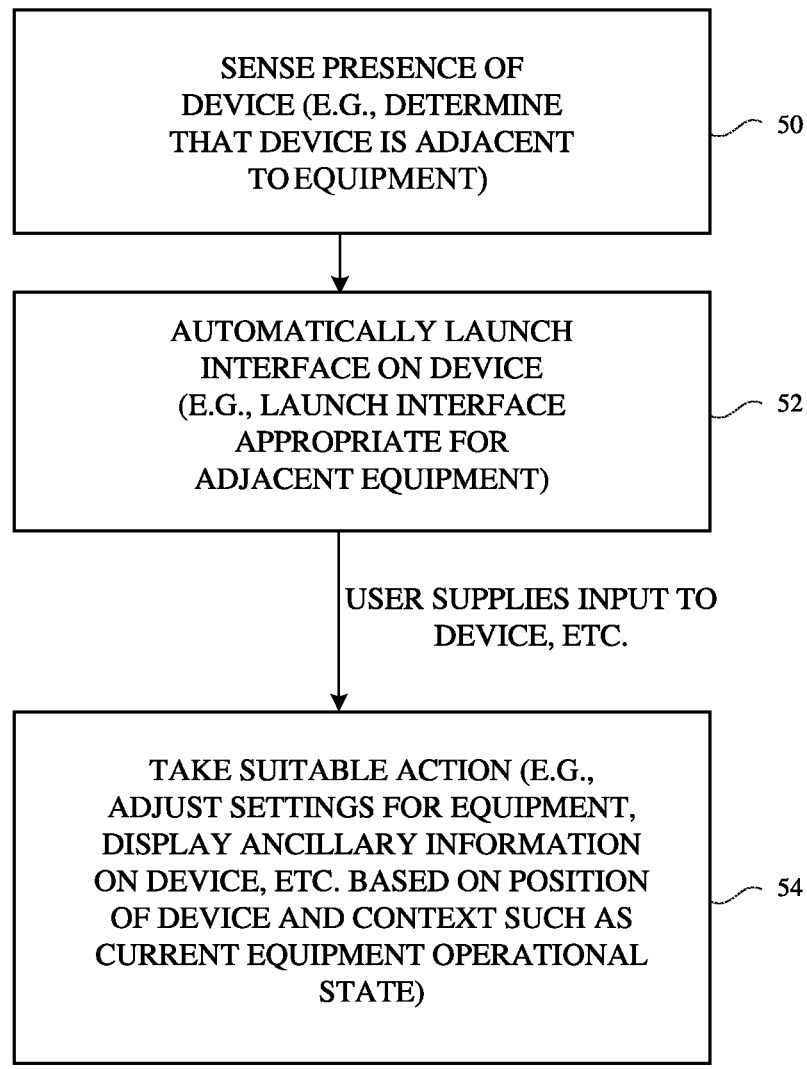
FIG. 6 is a flow chart of illustrative operations involved in operating a system such as the system of FIG. 1 in accordance with an embodiment.

Illustrative operations involve in using system 10 of FIGS. 1 and 2 are shown in the flow chart of FIG. 6.

During the operations of block 50, system 10 may sense the presence of device 14 in the vicinity of equipment 12. Device 14 and/or equipment 12 may, for example, use signal emitting and/or signal sensing operations of the type described in connection with FIGS. 3, 4, and 5 to determine whether device 14 is within a threshold distance of equipment 12 and/or to determine the position of device 14 on surface 18 or other portion of equipment 12. After determining that device 14 is adjacent to equipment 12 and determining the position of device 14 relative to equipment 12 (e.g., the position of device 14 in dimensions X and Y on surface 18 of FIG. 1), system 10 may launch a corresponding user interface on device 14 (block 52).

The operations of block 52 may include, for example, automatically launching on-screen options or presenting other content on display 16 of device 14 based on the current position of device 14 adjacent to equipment 12 and/or based on contextual information (e.g., the current operating states of equipment 12 and/or device 14, the current information being displayed by a display in equipment 12, etc.).

The content that is displayed during the operations of block 52 may include output that is based on the position of device 14 and the current operating state (context) of equipment 12 and/or device 14. If desired, the content that is displayed may include selectable on-screen options that serve as a user control interface for equipment 12. As an example, equipment 12 may have first and second adjustable functions. In response to determining that device 14 is adjacent to equipment 12 in position A, a user interface that provides a user with a selectable option (e.g., a touch selectable option) for adjusting the first function may be automatically displayed on display 16. In response to determining that device 14 is adjacent to equipment 12 in position B, a user interface that provides the user with an option for adjusting the second function may be automatically displayed on display 16. By automatically displaying these position-dependent options in response to detecting that device 14 is within range of equipment 12, the user need not invoke the user interfaces by entering information into a touch screen display or other input device in device 14. If desired, arrangements in which some or all of the user interface is manually launched may also be used for system 10.

If a user taps on an on-screen option in a displayed user interface on display 16 of device 14 or otherwise uses the displayed user input interface to supply user input, system 10 may, during the operations of block 54, take appropriate action in response to the user input. In general, system 10 (e.g., equipment 12 and/or device 14) may take any suitable action in response to the user input. As an example, if equipment 12 contains media playback equipment, a playback setting such as a playback volume may be adjusted, a track selection may be made, a fast forward or rewind operation may be performed, playback may be paused, stopped, or initiated, etc. As another example, if equipment 12 includes environmental control components such as heaters or air conditioners, equipment 12 may adjust a temperature setting, fan setting, or other environmental control setting in response to receiving the user input. User input may also be used to adjust vehicle controls in a vehicle, to adjust lighting settings in a vehicle or building, to adjust output volume from a speaker in equipment 12, and/or to make other adjustments to system 10. If desired, device 14 may be used to display information (e.g., ancillary information that is not normally displayed by a display in equipment 12 or other information) on display 16. The displayed ancillary information may be selected based on the position of device 14 relative to equipment 12 and may be associated with displayed content in equipment 12 or other contextual information (e.g., the ancillary information may supplement the displayed content in equipment 12).

Figure 7:
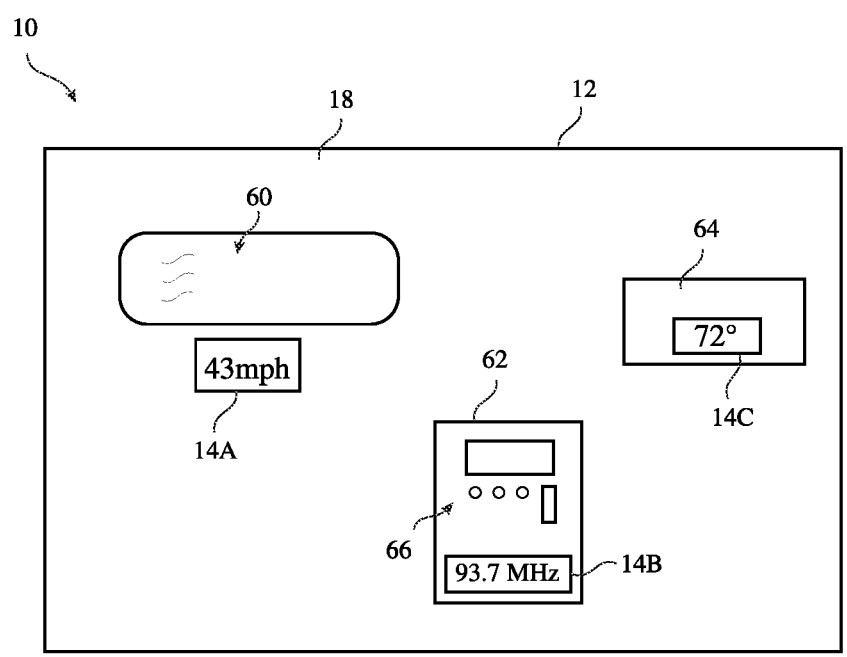
FIG. 7 is a diagram of a vehicle interior showing how an electronic device can serve as a position-dependent and context-dependent user interface for electronic equipment in a vehicle in accordance with an embodiment.

FIG. 7 is a diagram of an illustrative vehicle-based system. As shown in FIG. 7, vehicle 12 may have surface regions (surface 18) associated with information display 60, console 62, and dashboard area 64. Display 60 may be located on a dashboard or windshield (e.g., display 60 may be a heads-up display). Console 62 may include rotary knobs and other buttons 66 for controlling environmental systems (air conditioning, heating, fans, etc.) and media devices (e.g., a radio). Area 64 may be associated with a cosmetic interior body panel in a dashboard or other region of vehicle 12. Area 64 may, for example, be covered with leather, wood, or other materials on a dashboard. A user of device 14 may move device 14 into various positions relative to vehicle 12. As device 14 is placed in different positions on surface(s) 18, different position-dependent (and, if desired, context-dependent) user interfaces and/or ancillary information may be automatically displayed on display 16

For example, if device 14 is placed in position 14A of FIG. 7, device 14 will be adjacent to display 60 and may be used for displaying ancillary information related to the content of display 60. If, as an example, display 60 is displaying navigation system information such as driving directions, ancillary information such as images of points of interest along the user's current route may be automatically displayed on device 14 or may display vehicle speed information (e.g., "43 mph") or other information related to speedometer information or other information being displayed on display 60.

As another example, if device 14 is placed in position 14B of FIG. 7 adjacent to input devices 66 of console 62, a user control interface that includes console-related options may be displayed. The console-related options may include, for example, favorite radio stations for a radio in vehicle 12, favorite volume and equalization settings for the radio of vehicle 12, selectable temperature and fan settings, etc.

If device 14 is place in another position such as position 14C of FIG. 7, device 14 may automatically display information associated with position 14C (e.g., the current temperature of the right side of vehicle 12 in a scenario in which position 14C is located in front of a right-hand seat, information on media that is viewable from the right side of vehicle 12 and that is not viewable in other areas of vehicle 12, etc.). The displayed content in position 14C may be a user-adjustable temperature setting (e.g., a user control interface that is different than the user control interface displayed when the device is in position 14B).

Figure 8:
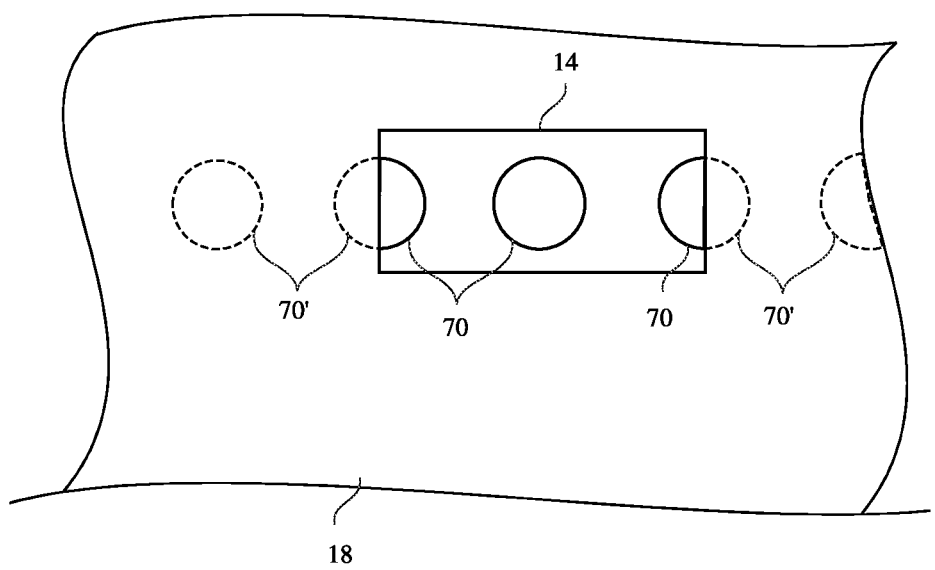
FIG. 8 is a diagram showing how interactive content on an electronic device may vary as a function of position of the device on a dashboard or as a function of position relative to other equipment in accordance with an embodiment.

As these examples demonstrate, the content on device 14 may change dynamically as a function of the current position of device 14 on surface 18. If desired, different types of content and user interface controls may be presented as a user moves device 14 across surface 18. A shown in FIG. 8, a variety of user interface controls and other content 70 and 70' may be associated with different positions on surface 18. When content associated with a particular location is not overlapped by device 14 (see, e.g., content 70'), that content is not presented on device 14. When content associated with a particular location is overlapped by device 14 (see, e.g., content 70), that content is presented on device 14. Content 70 may include user interface controls and ancillary information) and may be updated as a user moves device 14 to different positions on surface 18.

Figure 9:
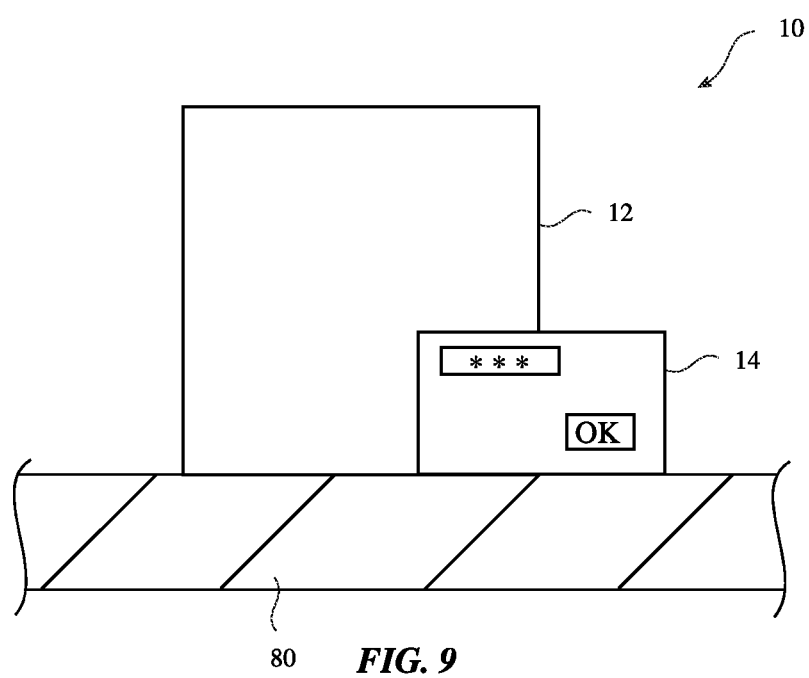
FIG. 9 is a diagram of an illustrative electronic device serving as a user interface for adjacent electrical equipment such as a wireless router in accordance with an embodiment.

In the illustrative configuration of FIG. 9, device 14 has been placed adjacent to equipment 12 on support structure 80 (e.g., a table or floor). Equipment 12 may be, for example, wireless networking equipment such as a router, access point, or network switch. When system 10 detects that device 14 is adjacent to equipment 12, a user control interface may be automatically displayed on display 16 (e.g., an interface that provides the user with touch-selectable options to adjust encryption settings, passwords, SSIDs and other identifiers, and other networking settings). A user may own numerous pieces of wireless networking equipment. By detecting that device 14 is adjacent to equipment 12 and automatically displaying an appropriate user control interface, the ability of the user to easily adjust settings for equipment 12 is enhanced.

Figure 10:
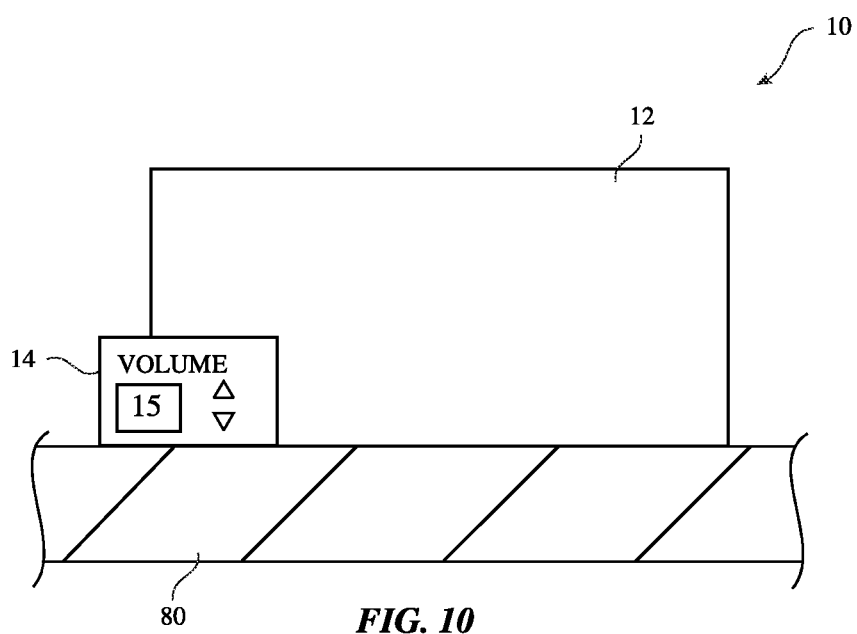
FIG. 10 is a diagram of an illustrative electronic device serving as a user interface for adjacent electrical equipment containing a speaker in accordance with an embodiment.

In the example of FIG. 10, device 14 has been placed adjacent to equipment 12 that has one or more speakers. Equipment 12 may, as an example, receive music and other information from the internet over a wireless connection and may play the music and other information for a user. A user may place device 14 adjacent to equipment 12 when it is desired to adjust wireless communications settings (e.g., a password that device 14 uses to connect to a wireless local area network), when it is desired to adjust media playback settings (e.g., a playback volume associated with playing content through a speaker in equipment 12, bass and treble settings, etc.), or when it is desired to adjust other settings for equipment 12.

Figure 11:
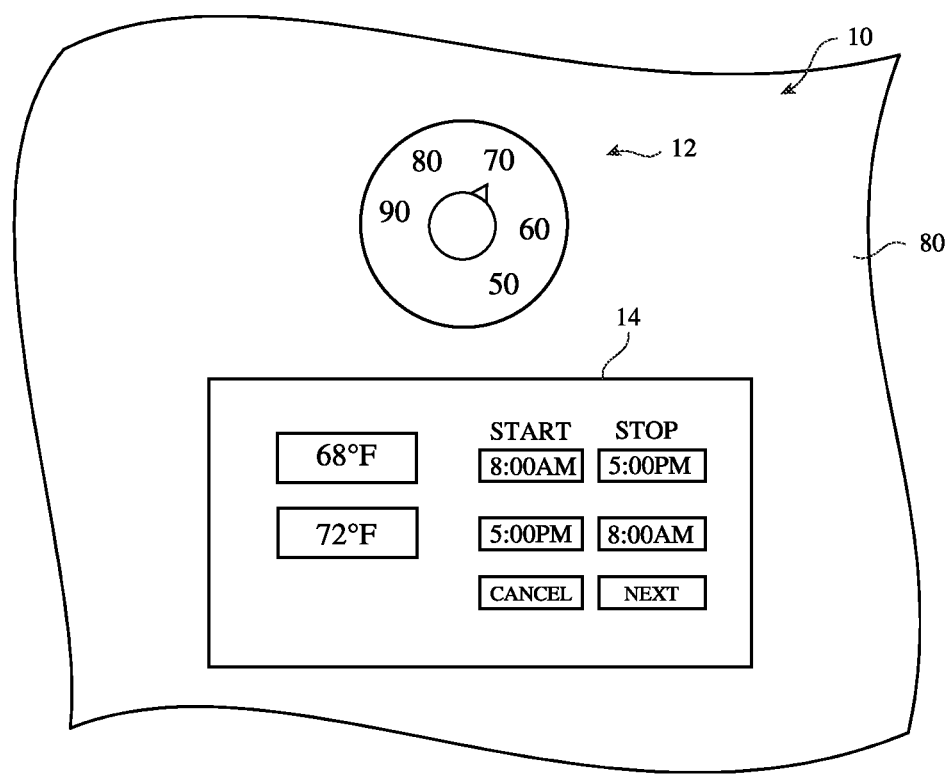
FIG. 11 is a diagram of an illustrative electronic device serving as a user interface for adjacent electrical equipment such as a wall-mounted thermostat in a building in accordance with an embodiment.

Another illustrative arrangement for system 10 is shown in FIG. 11. In the example of FIG. 11, equipment 12 is a thermostat mounted on a wall of a building (see, e.g., support structure 80). Equipment 12 may be used to adjust heating and cooling settings or other environmental control settings for air conditioning and heating units. A user may place device 14 adjacent to equipment 12 when it is desired to adjust a temperature setting, fan setting, temperature schedule, or other setting associated with equipment 12. In response to detecting that device 14 is adjacent to equipment 12, system 10 may automatically display an on-screen user control interface (user input interface) on the display of device 14 to allow the user to make these setting adjustments, as shown in FIG. 11.

Figure 12:
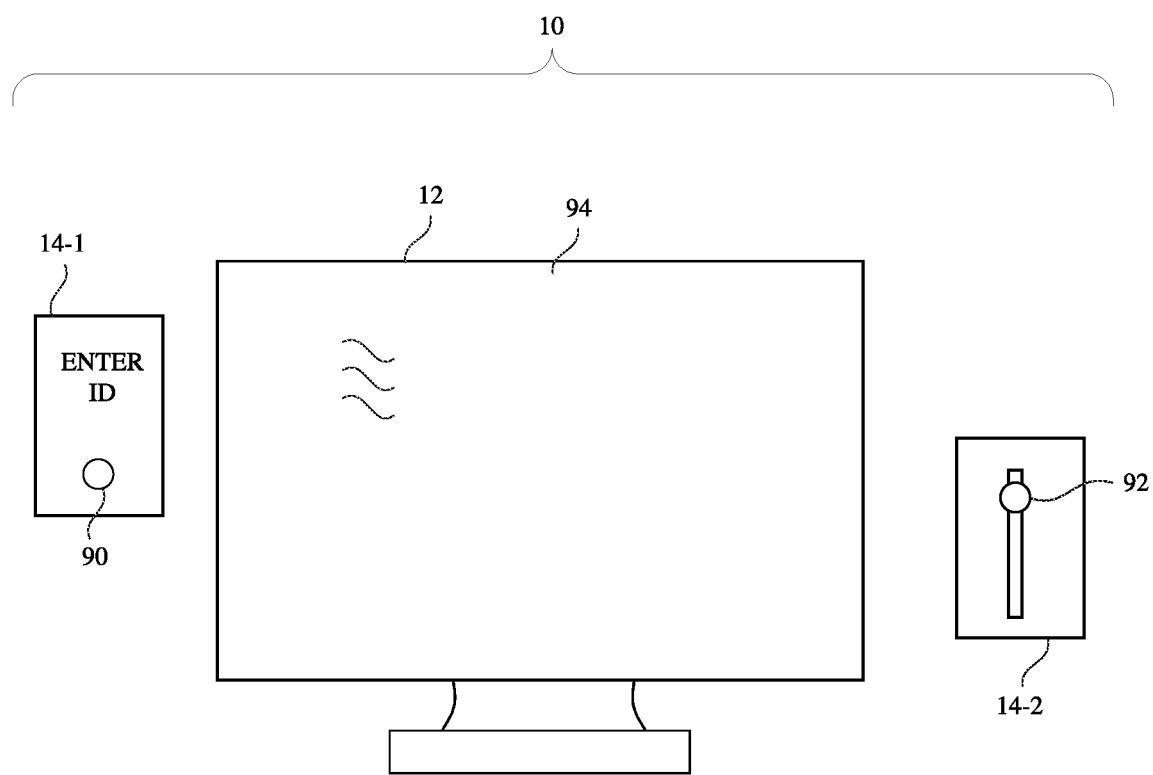
FIG. 12 is a diagram of illustrative electronic devices serving as user interfaces for adjacent electrical equipment such as a display with an embedded computer in accordance with an embodiment.

If desired, equipment 12 may be a computer or other electronic device. In the example of FIG. 12, equipment 12 is a desktop computer with a display such as display 90. When the user places device 14 in location 14-1, device 14 may automatically display instructions asking the user to enter a user access credential (e.g., a fingerprint that may be entered using fingerprint reader 90, a username and password or other identifier, etc.). This allows device 14 to be used to securely provide the user's identity to equipment 12 (e.g., to log into equipment 12). When the user places device 14 in location 14-2, device 14 may automatically display a different user interface (e.g., a sliding on-screen option such as slider 92). The user may adjust slider 92 to adjust a speaker volume, display contrast or brightness for display 94, or other adjustable setting for display 94 or other component in equipment 12.

In general, any suitable equipment 12 may be controlled using one or more adjacent devices 14. The foregoing examples are merely illustrative.

The foregoing is merely illustrative and various modifications can be made to the described embodiments. The foregoing embodiments may be implemented individually or in any combination.

What is claimed is:

1. An electronic device that is operable to control a system having equipment, the electronic device comprising:
   a sensor configured to gather sensor data;
   control circuitry configured to:
   determine a distance between the electronic device and the equipment based on the sensor data; and
   determine whether the electronic device is in a first position relative to the equipment or a second position relative to the equipment; and
   a display configured to automatically launch a user control interface that includes an on-screen option to adjust the equipment in response to determining that the distance between the electronic device and the equipment is less than a threshold distance, wherein the on-screen option comprises a first on-screen option when the electronic device is in the first position relative to the equipment and comprises a second on-screen option when the electronic device is in the second position relative to the equipment, wherein the first on-screen option is different from the second on-screen option, wherein the first and second positions are within the threshold distance, and wherein the first on-screen option is used to:
   adjust volume settings when the equipment is a speaker,
   adjust lighting settings when the equipment is a light source, and
   adjust temperature settings when the equipment is a thermostat.

2. The electronic device defined in claim 1 wherein the sensor is selected from the group consisting of: a camera, an ultrawideband receiver, and a magnetic sensor.

3. The electronic device defined in claim 2 wherein the display comprises a touch-sensitive display configured to receive touch input on the user control interface.

4. The electronic device defined in claim 3 wherein the control circuitry is configured to send control signals to the equipment in response to the touch input.

5. The electronic device defined in claim 1 wherein the control circuitry is configured to remove the on-screen option from the display when the distance is greater than the threshold distance.

6. An electronic device that is operable to control equipment, the electronic device comprising:
   a sensor configured to gather sensor data;
   control circuitry configured to determine when the electronic device is within a threshold distance of the equipment and whether the electronic device is in a first position within the threshold distance or a second position within the threshold distance, wherein the equipment is selected from the group consisting of: a speaker, a light source, and a thermostat; and
   a display configured to:
   automatically launch a user control interface that includes an on-screen option to control the equipment in response to determining that the electronic device is within the threshold distance of the equipment, wherein the on-screen option includes a first on-screen option when the electronic device is in the first position within the threshold distance and includes a second on-screen option when the electronic device is in the second position within the threshold distance, and wherein the first on-screen option is different from the second on-screen option.

7. The electronic device defined in claim 6 wherein the equipment includes an external display and wherein the first on-screen option is used to adjust a display brightness of the external display.

8. The electronic device defined in claim 6 wherein the sensor is selected from the group consisting of: a camera, an ultrawideband receiver, and a magnetic sensor.

9. The electronic device defined in claim 6 wherein the first on-screen option includes a request for user access credentials.

10. The electronic device defined in claim 6 wherein the display comprises a touch sensor configured to detect touch input on the display and wherein the control circuitry is configured to send control signals to the equipment in response to the touch input.

\* \* \* \* \*